United States Patent [19]

Tang

[11] 4,212,166
[45] Jul. 15, 1980

[54] HYDRAULIC BRAKE BOOSTER AND RELIEF VALVE THEREFOR

[75] Inventor: Louis S. Tang, Mishawaka, Ind.

[73] Assignee: The Bendix Corporation, Southfield, Mich.

[21] Appl. No.: 904,946

[22] Filed: May 11, 1978

[51] Int. Cl.² .............................................. B60T 11/32
[52] U.S. Cl. .................... 60/582; 60/547 R; 60/404
[58] Field of Search ................ 60/582, 547, 555, 403, 60/404

[56] References Cited

U.S. PATENT DOCUMENTS

| 3,719,044 | 3/1973 | Bach | 60/404 |
|---|---|---|---|
| 4,052,851 | 10/1977 | Brown | 60/582 |

Primary Examiner—Edgar W. Geoghegan
Attorney, Agent, or Firm—Paul David Schoenle; Ken C. Decker

[57] ABSTRACT

A hydraulic brake booster includes a housing which substantially defines a pressure chamber and the housing slidably supports a control valve for communicating pressurized fluid to the pressure chamber. A piston is movably disposed within the housing to move in response to pressurized fluid within the pressure chamber and the piston substantially defines a storage chamber located inside the piston. A charging valve communicates pressurized fluid to the storage chamber and a relief valve vents the storage chamber to the pressure chamber when the pressure stored in the storage chamber is above a predetermined value. An input member cooperates with the piston to define an actuating cavity which communicates with the relief valve so that the input member is movable relative to the piston to pressurize the actuating cavity which causes the relief valve to open communication between the storage chamber and the pressure chamber.

4 Claims, 4 Drawing Figures

HYDRAULIC BRAKE BOOSTER AND RELIEF VALVE THEREFOR

BACKGROUND OF THE INVENTION

A hydraulic brake booster communicates with a pressure source and is operable upon a brake application to provide a power assist during braking. An input member cooperates with a control valve to control communication of pressurized fluid to a pressure chamber and a piston within the brake booster is movable in response to pressurized fluid within the pressure chamber in order to generate a power assist for a brake application. The piston also defines a storage chamber located inside the piston and a charging valve communicates pressurized fluid from the pressure chamber to the storage chamber.

If the pressure of the pressurized fluid communicated to the pressure chamber is insufficient to move the piston during braking, an input member is engageable with the charging valve to open the storage chamber to the pressure chamber, thereby increasing the pressure of pressurized fluid within the pressure chamber.

SUMMARY OF THE INVENTION

The present invention relates to an improvement in the hydraulic brake booster of the prior art. In particular the invention covers the apparatus utilized to open the storage chamber to the pressure chamber when the pressurized fluid within the latter is insufficient to move the piston during a braking application.

The piston carries a relief valve which operates normally to relieve excessive pressure within the storage chamber to the pressure chamber. The input member is received within a blind bore in the piston to substantially define an actuating cavity and the input member is movable relative to the piston to pressurize the actuating cavity when the pressure of the pressurized fluid within the pressure chamber is insufficient to move the piston. The actuating cavity communicates with the relief valve so that pressurization of the actuating cavity imparts an opening force to the relief valve to open communication between the storage chamber and the pressure chamber.

In particular, the relief valve comprises a plunger which is normally biased to a position closing the storage chamber to the pressure chamber. The plunger is sealingly and slidably disposed within a stepped bore or passage in the piston and the actuating cavity communicates with the stepped bore via a radial opening.

It is a primary object of the present invention to provide apparatus for hydraulically actuating a valve member which is operable to communicate the storage chamber with the pressure chamber when the pressurized fluid within the latter is insufficient to move the piston.

DETAILED DESCRIPTION

Figure 1:
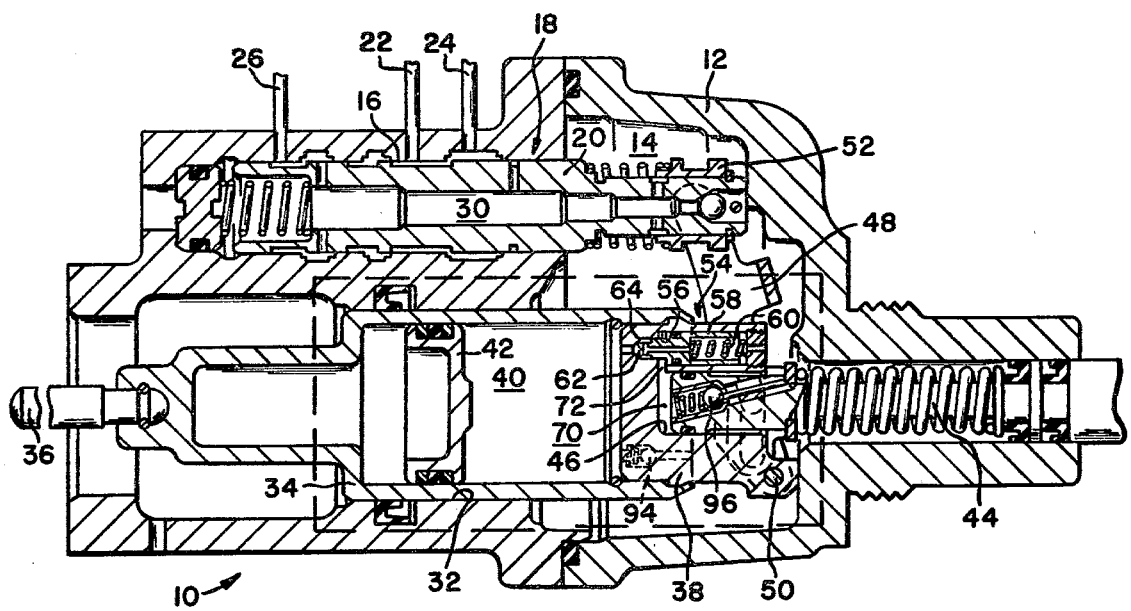
FIG. 1 is a cross section view of a hydraulic brake booster constructed in accordance with the present invention.

The hydraulic brake booster 10 of FIG. 1 includes a housing 12 which substantially defines a pressure chamber 14. The housing forms a first bore 16 which movably receives a control valve 18 in the form of a spool valve 20. The control valve cooperates with an inlet 22, an outlet 24 and a return 26 to control communication of pressurized fluid to the pressure chamber 14 via a central passage 30 in the spool valve 20.

A second bore 32 in the housing 12 movably receives a piston 34. The piston terminates in a projection 36 which couples to a master cylinder (not shown) and the piston includes a plug 38 opposite the projection 36. The piston 34 is hollow to define and enclose a storage chamber 40 on one side of a diaphragm 42, while the other side of the diaphragm 42 contains a compressible medium.

An input member 44 extends into the pressure chamber 14 and is received in a blind bore 46 on the piston plug 38. The input member cooperates with a lever 48 which is pivotally connected to the piston at 50 and the control valve at 52 to control movement of the control valve 18 within the first bore 16 and to control manual movement of the piston 34 within the second bore 32.

In accordance with the invention a relief valve 54 is disposed within a passage or stepped bore 96 in the piston plug 38. The relief valve 54 comprises a plunger 58 which is biased by a spring 60 to engage an end 62 with a shoulder 64 thereby closing the passage 56 which extends through the piston plug 38 to communicate the storage chamber 40 with the pressure chamber 14. The blind bore 46 receives the input member 44 to substantially define an actuating cavity 70 and a radial opening 72 communicates the actuating cavity 70 with the passage 56.

A plug 80 is threadably coupled to the passage 56 to oppose the spring 60 and an aperture 82 on the plug 80 permits fluid communication with the pressure chamber 14.

The plunger 58 forms at least one radial passage 90 which communicates with a central passage 92 to permit fluid communication through the plunger.

MODE OF OPERATION

Figure 2:
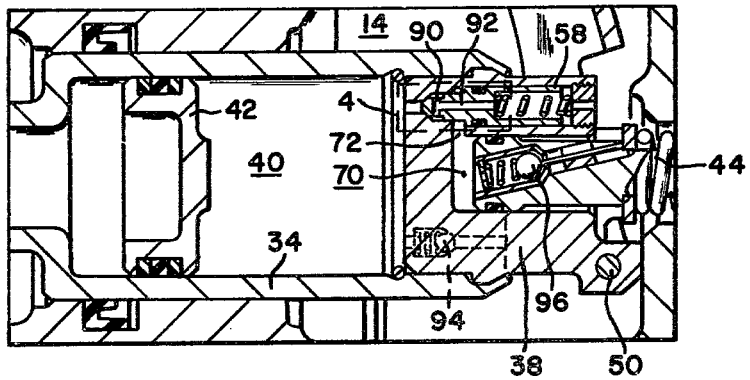
FIG. 2 is an enlarged cross section view of the encircled portion of FIG. 1.
Figure 4:
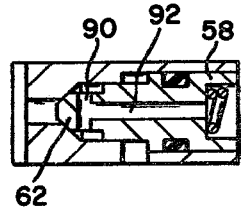
FIG. 4 is an enlarged cross section view of an encircled portion of FIG. 2.

Turning to FIG. 2, pressurized fluid communicated to the pressure chamber 14 is communicated to the storage chamber 40 by means of a check valve 94 to compress the compressible media thereby pressurizing the storage chamber 40. In addition, the check valve 96 permits communication of pressurized fluid to the actuating cavity 70.

During normal braking the input member 44 pivots the lever 48 about the point 50 to move the control valve 18 such that pressurized fluid is communicated to the pressure chamber 14. When the pressure of the pressurized fluid communicated to the pressure chamber 14 reaches a predetermined value, the piston 34 moves to the left to actuate the master cylinder, thereby providing a power assist to the braking application.

Figure 3:
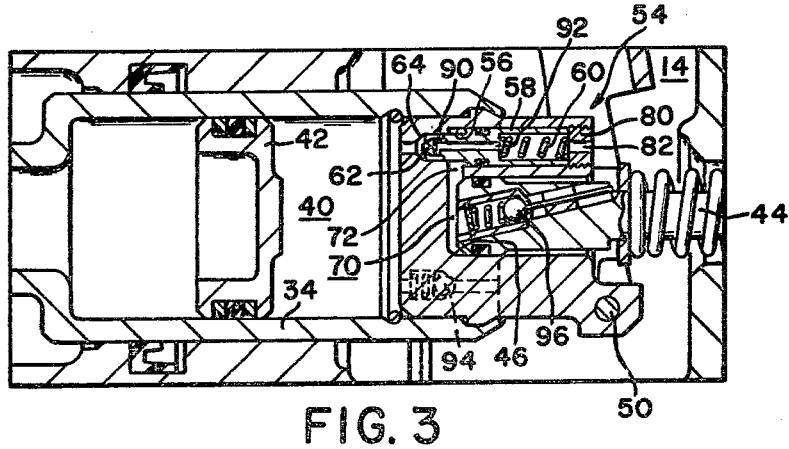
FIG. 3 is an enlarged view similar to FIG. 2 showing the hydraulic brake booster during a reserve power assist.

If the pressurized fluid communicated to the pressure chamber 14 is insufficient to move the piston 34, the input member 44 is moved further to pressurize the fluid trapped within the actuating cavity 70. This increase in pressure in the actuating cavity 70 is transmitted via the radial opening 72 to the passage 56 to impart an opening force on the plunger 58 against the spring 60. Movement of the plunger 58 to the right, as seen in FIG. 3, opens the passage 56 to communicate pressurized fluid from the storage chamber 40 to the pressure chamber 14 via passage 56, radial passage 90, central passage 92 and aperture 82. Consequently, even though the control valve 18 does not communicate enough pressurized fluid to the pressure chamber to move the piston 34, the relief valve plunger 58 is movable upon pressurization of the actuating cavity 70 to provide reserve pressurization of the pressure chamber 14 by communicating the storage chamber 40 with the pressure chamber 14.

During non-braking, the relief valve 54 operates in a conventional manner to vent the storage chamber to the pressure chamber if excessive pressure buildup occurs in the storage chamber.

It is evident from the foregoing description that many modifications and/or additions are possible by one skilled in the art and it is intended that these modifications and/or additions are included within the scope of the appended claims.

I claim:

1. In a hydraulic brake booster having a housing substantially defining a pressure chamber, a control valve within the housing communicating pressurized fluid to the pressure chamber, a piston movable in response to pressurized fluid within the pressure chamber and substantially defining a storage chamber located inside the piston and an input member cooperating with the piston to move the latter when the pressurized fluid communicated to the pressure chamber is below a predetermined value, the improvement wherein said piston carries a relief valve and said input member cooperates with said piston to define an actuating cavity, the actuating cavity communicating with the relief valve and said input member being movable relative to said piston to pressurize the actuating cavity which causes the relief valve to open the storage chamber to the pressure chamber.

2. The hydraulic brake booster of claim 1 in which said piston includes a blind bore for receiving said input member and a passage for communicating the storage chamber with the pressure chamber, the blind bore and the passage communicating with each other via a radial opening on said piston.

3. In a hydraulic brake booster having a housing substantially defining a pressure chamber, a control valve cooperating with the housing to communicate pressurized fluid to the pressure chamber, a piston movable in response to pressurized fluid in the pressure chamber, the piston substantially defining a storage chamber located inside the piston, an input member cooperating with the control valve to move the latter within the housing and cooperating with the piston to move the latter when the pressure of the pressurized fluid within the pressure chamber is below a predetermined value, and a relief valve carried by the piston to open communication between the storage chamber and the pressure chamber when the pressure within the storage chamber is above a predetermined value, the improvement wherein the input member is movable relative to the piston to open the relief valve, thereby communicating the storage chamber with the pressure chamber via the open relief valve.

4. The hydraulic brake booster of claim 3 in which the piston includes a blind bore for receiving the input member, the input member being movable within the blind bore to pressurize fluid therein and the relief valve being movable in response to the pressurized fluid in the blind bore.

* * * * *